(12) United States Patent
G et al.

(10) Patent No.: US 12,107,843 B2
(45) Date of Patent: Oct. 1, 2024

(54) ACCESSING CLOUD DATA PROVIDERS WITH USER-IMPERSONATION

(71) Applicant: SAP SE, Walldorf (DE)

(72) Inventors: Sathya G, Kerala (IN); Sateesh Babu Chilamakuri, Tirupati (IN)

(73) Assignee: SAP SE, Walldorf (DE)

( * ) Notice: Subject to any disclaimer, the term of this patent is extended or adjusted under 35 U.S.C. 154(b) by 366 days.

(21) Appl. No.: 17/533,315

(22) Filed: Nov. 23, 2021

(65) Prior Publication Data

US 2023/0164131 A1    May 25, 2023

(51) Int. Cl.
 *H04L 9/40* (2022.01)
(52) U.S. Cl.
 CPC ........ *H04L 63/0815* (2013.01); *H04L 63/083* (2013.01); *H04L 63/0876* (2013.01); *H04L 63/102* (2013.01); *H04L 63/105* (2013.01); *H04L 63/1483* (2013.01)
(58) Field of Classification Search
 CPC ............... H04L 63/0815; H04L 63/083; H04L 63/0876; H04L 63/102; H04L 63/105; H04L 63/1483
 USPC .......................................................... 726/5
 See application file for complete search history.

(56) References Cited

U.S. PATENT DOCUMENTS

| | | | |
|---|---|---|---|
| 10,389,704 B1 * | 8/2019 | Gupta | H04L 67/1097 |
| 2020/0311137 A1 * | 10/2020 | Gupta | G06F 3/067 |
| 2023/0099186 A1 * | 3/2023 | Virtuoso | G06F 9/5072 718/1 |

* cited by examiner

*Primary Examiner* — Kambiz Zand
*Assistant Examiner* — Phuc Pham
(74) *Attorney, Agent, or Firm* — Sterne, Kessler, Goldstein & Fox P.L.L.C.

(57) ABSTRACT

Disclosed herein are system, method, and computer-readable medium embodiments for securely accessing cloud data providers with user-impersonation. An embodiment operates by receiving an initial logon request for a cloud data provider. The embodiment authenticates the request using a cluster unique identifier (CUID) of the cloud data provider. The embodiment then authorizes the request by exchanging an authorization code for an identifier token and a refresh token issued by the cloud data provider. The embodiment then validates the tokens, and stores the refresh token for subsequent user-impersonation logons. Subsequently, the embodiment receives a user-impersonation logon request for the cloud data provider. The embodiment exchanges the refresh token for an access token issued by the cloud data provider, and uses the access token to gain access to the cloud data provider without a user directly having to complete authentication and authorization processes.

20 Claims, 5 Drawing Sheets

ACCESSING CLOUD DATA PROVIDERS WITH USER-IMPERSONATION

BACKGROUND

Software (e.g., enterprise software) often supports a large number of users and diverse user actions. Such software also often interfaces with cloud data providers to allow users to access off-site data stored in the cloud data providers. When using such software, users may sometimes sign into a cloud data provider as another user in order to access data. This user-impersonation may allow an administrator or a user-impersonated scheduler to manage the data stored in the cloud data provider. This user-impersonation often requires direct authentication and authorization at every logon attempt. Alternatively, this user impersonation may avoid the need for reoccurring direct authentication and authorization at every logon attempt but only support one cloud data provider. Therefore, there is a need for a user-impersonation that interfaces with multiple cloud data providers without requiring reoccurring direct authentication and authorization processes at every logon attempt. Additionally, there is a need for the user-impersonation to interface securely with the cloud data providers in order to maintain security of the user's system and information.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and/or computer-readable medium embodiments, and/or combinations and sub-combinations thereof, for securely accessing multiple cloud data providers with user-impersonation without requiring reoccurring direct authentication and authorization processes at every logon attempt.

There are at least three technological problems associated with a user signing into a cloud data provider as another user in order to access data. First, such user-impersonation often requires direct authentication and authorization at every logon attempt. Second, such user-impersonation may be limited to a single cloud data provider. Third, such user-impersonation may not interface securely with a cloud data provider.

Embodiments herein solve these technological problems using an innovative security token service (STS) that manages logon information and access requirements. For example, the STS may facilitate a user's initial authentication and authorization processes for a first logon to a cloud data provider and store logon information from these processes. For subsequent logons involving user-impersonation, the STS may retrieve the stored logon information, satisfy access requirements of the cloud data provider through a token exchange, and provide access to the cloud data provider without direct user action.

Embodiments herein may further solve the above technological problems using a cluster unique identifier (CUID) and the STS. For example, cloud data providers configured in a system using the STS may be affiliated with a specific CUID. Before logon information is stored in the system, the STS may validate the information based on the CUID in order to maintain security.

Embodiments herein provide various benefits. For example, the STS can securely interface with multiple cloud data providers so long as a cloud data provider is configured and an initial logon has been conducted. In other words, after there has been initial logon to a cloud data provider using the STS, a user-impersonator can seamlessly access the cloud data provider without directly needing to logon. Therefore, the STS solves the above technological problems by providing a secure user-impersonation that interfaces with multiple cloud data providers without requiring direct reoccurring authentication and authorization processes at every logon attempt.

Figure 1:
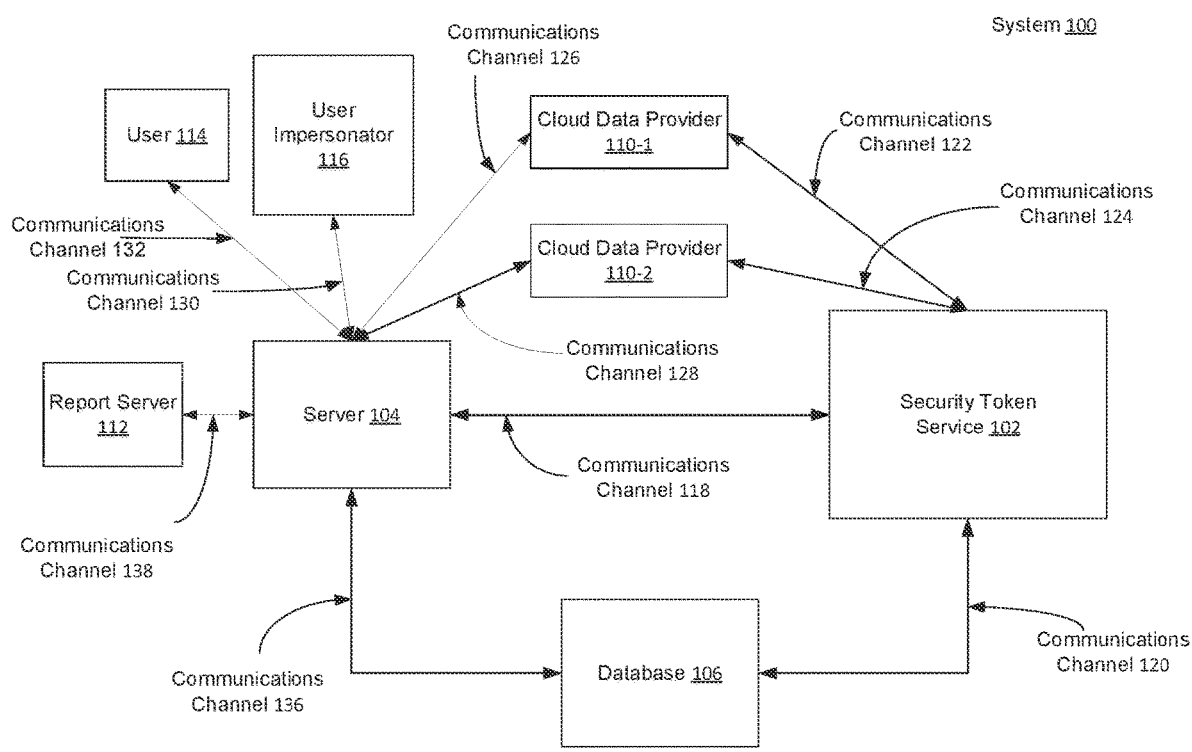
FIG. 1 is a block diagram of a system for securely accessing cloud data providers with user-impersonation, according to some embodiments.

FIG. 1 is a block diagram of a system 100 for securely accessing cloud data providers with user-impersonation, according to some embodiments. System 100 may include STS 102, server 104, database 106, cloud data providers 110-1 and 110-2, user 114, and user-impersonator 116. System 100 may include report server 112. System 100 may include various other components as would be appreciated by a person of ordinary skill in the art.

STS 102 may manage logon information. STS 102 may manage access requirements. STS 102 may be a service, a server, or a combination thereof. STS 102 may contain a central management server that manages interactions with other system components. STS 102 may be implemented on a server computer, virtual machine, container, cloud-computing platform, or other device as would be appreciated by a person of ordinary skill in the art. STS 102 may be implemented on a desktop computer, laptop, tablet, smartphone, or other device as would be appreciated by a person of ordinary skill in the art.

STS 102 may send logon information to a cloud data provider 110. STS 102 may receive logon information from a cloud data provider 110. For example, STS 102 may send an authorization code to a cloud data provider 110. An authorization code may be a code that STS 102 exchanges for a token. The authorization code may be obtained from an authorization server of cloud data provider 110.

In exchange for the authorization code, STS 102 may receive an identifier token and a refresh token from the cloud data provider 110. An identifier token may be used to identify a user. An identifier token may be a JSON® Web Token (alternatively known as an ID token). A refresh token may be used to produce a new access token. A refresh token may have a specific lifetime. For example, a refresh token may have a lifetime longer than 24 hours and equal to or shorter than an infinite time.

STS 102 may interface with a cloud data provider 110 through communications channels 122 or 124, which may be wired, wireless, or a combination thereof. Communications channels 122 or 124 may include any combination of Local Area Networks, Wide Area Networks, the Internet, etc. Control logic or data may be transmitted to and from STS 102 via communications channels 122 or 124.

STS 102 may send logon information to server 104. STS 102 may receive logon information from server 104. For example, STS 102 may receive an initial logon request for a cloud data provider 110 from server 104. For example, the initial logon request may be from user 114. For example, STS 102 may also send the initial logon request back to server 104 in order to perform a first logon to the cloud data provider 110. STS 102 may interface with server 104 through communications channel 118, which may be wired, wireless, or a combination thereof. Communications channel 118 may include any combination of Local Area Networks, Wide Area Networks, the Internet, etc. Control logic or data may be transmitted to and from STS 102 via communications channel 118.

STS 102 may send logon information to database 106. STS 102 may receive logon information from database 106. For example, STS 102 may store a refresh token in database 106. For example, STS 102 may also receive a refresh token from database 106. STS 102 may interface with database 106 through communications channel 120, which may be wired, wireless, or a combination thereof. Communications channel 120 may include any combination of Local Area Networks, Wide Area Networks, the Internet, etc. Control logic or data may be transmitted to and from STS 102 via communications channel 120.

Server 104 may process logon requests. Server 104 may also conduct logons. Server 104 may be a web server that is accessed through a web browser. Server 104 may be an application server. Server 104 may be implemented on a server computer, virtual machine, container, cloud-computing platform, or other device as would be appreciate by a person of ordinary skill in the art. Server 104 may be implemented on a desktop computer, laptop, tablet, smartphone, or other device as would be appreciated by a person of ordinary skill in the art.

Server 104 may logon to a cloud data provider 110. For example, server 104 may logon to a cloud data provider 110 in order to obtain an authorization code for use by STS 102. Server 104 may interface with a cloud data provider 110 through communications channels 126 or 128, which may be wired, wireless, or a combination thereof. Communications channels 126 or 128 may include any combination of Local Area Networks, Wide Area Networks, the Internet, etc. Control logic or data may be transmitted to and from Server 104 via communications channels 126 or 128.

Server 104 may send logon information to STS 102. Server 104 may receive logon information from STS 102. For example, server 104 may send an initial logon request (e.g., from user 114) for a cloud data provider 110 to STS 102. For example, server 104 may also receive the initial logon request back from STS 102 in order to perform a first logon to the cloud data provider 110. Server 104 may interface with STS 102 through communications channel 118, which may be wired, wireless, or a combination thereof. Communications channel 118 may include any combination of Local Area Networks, Wide Area Networks, the Internet, etc. Control logic or data may be transmitted to and from server 104 via communications channel 118.

Server 104 may send logon information to database 106. Server 104 may receive logon information from database 106. Server 104 may also send configuration information for a cloud data provider 110 to database 106. Server 104 may also receive configuration information for a cloud data provider 110 from database 106. Server 104 may interface with database 106 through communications channel 136, which may be wired, wireless, or a combination thereof. Communications channel 136 may include any combination of Local Area Networks, Wide Area Networks, the Internet, etc. Control logic or data may be transmitted to and from server 104 via communications channel 136.

Server 104 may send data to report server 112. For example, server 104 may send data from a cloud data provider 110 to report server 112. Server 104 may also receive data from report server 112. For example, server 104 may receive processed data from report server 112. Server 104 may interface with report server 112 through communications channel 138, which may be wired, wireless, or a combination thereof. Communications channel 138 may include any combination of Local Area Networks, Wide Area Networks, the Internet, etc. Control logic or data may be transmitted to and from server 104 via communications channel 138.

Server 104 may receive logon requests (e.g., an initial logon request) for a cloud data provider 110 from user 114. User 114 may be a first user identity that directly interacts with a cloud data provider 110 in order to perform a first logon. Server 104 may provide access to a cloud data provider 110 to user 114. Server 104 may interface with user 114 through communications channel 132, which may be wired, wireless, or a combination thereof. Communications channel 132 may include any combination of Local Area Networks, Wide Area Networks, the Internet, etc. Control logic or data may be transmitted to and from server 104 via communications channel 132.

Server 104 may also receive logon requests (e.g., a user-impersonation logon request) for a cloud data provider 110 from user-impersonator 116. User-impersonator 116 may be a second user identity used to perform a second logon to a cloud data provider 110 that impersonates a first logon performed by user 114. Server 104 may provide access to a cloud data provider 110 to user-impersonator 116. Server 104 may interface with user-impersonator 116 through communications channel 130, which may be wired, wireless, or a combination thereof. Communications channel 130 may include any combination of Local Area Networks, Wide Area Networks, the Internet, etc. Control logic or data may be transmitted to and from server 104 via communications channel 130.

Database 106 may store logon information. Database 106 may be a database management system (DBMS). Database 106 may be a secure store. Database 106 may be located at a single location or multiple locations. Database 106 may be implemented on a server computer, virtual machine, container, cloud-computing platform, or other device as would be appreciated by a person of ordinary skill in the art. Database 106 may be implemented on a desktop computer, laptop, tablet, smartphone, or other device as would be appreciated by a person of ordinary skill in the art.

Database 106 may send logon information to STS 102. For example, database 106 may send a refresh token to STS 102. Database 106 may also receive logon information from STS 102. For example, database 106 may receive a refresh token from STS 102 in order to store it. Database 106 may interface with STS 102 through communications channel 120, which may be wired, wireless, or a combination thereof. Communications channel 120 may include any combination of Local Area Networks, Wide Area Networks, the Internet, etc. Control logic or data may be transmitted to and from database 106 via communications channel 120.

Database 106 may also send logon information to server 104. For example, database 106 may send configuration information for a cloud data provider 110 to server 104. Database 106 may also receive logon information from server 104. For example, database 106 may receive configuration information for a cloud data provider 110 from server 104. Database 106 may interface with server 104 through communications channel 136, which may be wired, wireless, or a combination thereof. Communications channel 136 may include any combination of Local Area Networks, Wide Area Networks, the Internet, etc. Control logic or data may be transmitted to and from database 106 via communications channel 136.

A cloud data provider 110 may provide logon information to server 104. A cloud data provider 110 may allow access to itself. For example, a cloud data provider 110 may allow access to itself through an access token. An access token may contain authorization information about actions allowed to be performed at the cloud data provider 110. An access token may be a JSON® Web Token. An access token may have a specific lifetime. For example, an access token may have lifetime of less than 24 hours.

A cloud data provider 110 may provide data to server 104. A cloud data provider 110 may store data. A cloud data provider 110 may be an off-site storage system. A cloud data provider 110 may be a cloud data provider such as, but not limited to, a Snowflake Data Cloud®, Google Cloud Platform™, or Microsoft Azure®.

A cloud data provider 110 may include a token exchange server. A token exchange server may include a token endpoint. A token exchange server may be used to obtain an identifier token, a refresh token, or an access token.

A cloud data provider 110 may include an authorization server. An authorization server may include an authorization endpoint. An authorization server may be used to obtain an authorization code.

A cloud data provider 110 may be configured in system 100. Configuring a cloud data provider 110 in system 100 may create a CUID particular to the cloud data provider 110. The CUID may represent configuration information of the cloud data provider 110. The CUID may be stored in database 106. The CUID may be used throughout system 100 for interactions between components. For example, a CUID may be used by STS 102 to retrieve a corresponding refresh token from database 106.

The configuration information may include an issuer uniform resource identifier (URI). The issuer URI may be used to discover configurations of a cloud data provider 110.

The configuration information may include a JavaScript® Object Notation (JSON) Web Key Sets URI. JSON® Web Key Sets URI may be used to verify a JSON® Web Token issued by a cloud data provider 110 and signed using a signing algorithm.

The configuration information may include an identifier token signing algorithm. The identifier token signing algorithm may be used to verify the sender of a token and to ensure that the token has not been altered. For example, the identifier token signing algorithm may be used to verify the sender of an identifier token and to ensure that the identifier token has not been altered.

The configuration information may include an authorization endpoint. The authorization endpoint may be used to obtain an authorization code.

The configuration information may include a token endpoint. The token endpoint may be used to obtain an identifier token, a refresh token, or an access token.

The configuration information may include a client identifier. The client identifier may uniquely identify a client on a network. A client may be a hardware device or software that accesses a server (e.g., server 104). A client may be a user of the hardware device or software that accesses a server. A client may be user 114 or user-impersonator 116.

The configuration information may include a client secret. The client secret may be information known only to an application of a client or an authorization server of cloud data provider 110.

The configuration information may include a redirect URI. The redirect URI may be a uniform resource locator used after access to a cloud data provider 110 has been granted.

The configuration information may include a revocation endpoint. The revocation endpoint may be used to revoke a refresh token or an access token.

The configuration information may include an authorization scope. The authorization scope may specify the extent of access permitted by user 114 or user-impersonator 116. The configuration information may include other information as would be appreciated by a person of ordinary skill in the art.

A cloud data provider 110 may send logon information or data to server 104. A cloud data provider 110 may receive logon information or data from server 104. For example, a cloud data provider 110 may send an authorization code to server 104 to be used by STS 102. For example, a cloud data provider 110 may also receive an initial logon request from server 104. A cloud data provider 110 may interface with server 104 through communications channels 126 or 128, which may be wired, wireless, or a combination thereof. Communications channels 126 or 128 may include any combination of Local Area Networks, Wide Area Networks, the Internet, etc. Control logic or data may be transmitted to and from a cloud data provider 110 via communications channels 126 or 128.

A cloud data provider 110 may send logon information to STS 102. A cloud data provider 110 may receive logon information from STS 102. For example, a cloud data provider 110 may send an identifier token and a refresh token to STS 102. For example, a cloud data provider 110 may also receive an authorization code from STS 102. A cloud data provider 110 may interface with STS 102 through communications channels 122 or 124, which may be wired, wireless, or a combination thereof. Communications channels 122 or 124 may include any combination of Local Area Networks, Wide Area Networks, the Internet, etc. Control logic or data may be transmitted to and from a cloud data provider 110 via communications channels 122 or 124.

Report server 112 may receive data. Report server 112 may format data. Report server 112 may present data in certain document layouts. Report server 112 may be implemented on a server computer, virtual machine, container, cloud-computing platform, or other device as would be appreciated by a person of ordinary skill in the art. Report server 112 may be implemented on a desktop computer, laptop, tablet, smartphone, or other device as would be appreciated by a person of ordinary skill in the art.

Report server 112 may send data to server 104. For example, report server 112 may send processed data to server 104. Report server 112 may also receive requests or data from server 104. For example, report server 112 may receive data from server 104, which originated from a cloud data provider 110. Report server 112 may interface with server 104 through communications channel 138, which may be wired, wireless, or a combination thereof. Communications channel 138 may include any combination of Local Area Networks, Wide Area Networks, the Internet, etc. Control logic or data may be transmitted to and from report server 112 via communications channel 138.

User 114 may be a first user identity. User 114 may be an actual user who directly interacts with a cloud data provider 110 in order to complete initial authentication and authorization. User 114 may send requests to server 104. User 114 may gain access to a cloud data provider 110 through server 104. User 114 may interface with server 104 through communications channel 132, which may be wired, wireless, or a combination thereof. Communications channel 132 may include any combination of Local Area Networks, Wide Area Networks, the Internet, etc. Control logic or data may be transmitted to and from user 114 via communications channel 132.

User-impersonator 116 may be a second user identity. For example, server 104 may use the second user identity in order to perform a second logon that impersonates a first logon performed by user 114. User-impersonator 116 may be another actual user different from user 114. User-impersonator 116 may be a scheduling software designed to automate tasks as a user-impersonation of user 114. A scheduling software may be Windows® Task Scheduler or another software for automating tasks.

User-impersonator 116 may send requests to server 104. User-impersonator 116 may gain access to a cloud data provider 110 through server 104. User-impersonator 116 may interface with server 104 through communications channel 130, which may be wired, wireless, or a combination thereof. Communications channel 130 may include any combination of Local Area Networks, Wide Area Networks, the Internet, etc. Control logic or data may be transmitted to and from user-impersonator 116 via communications channel 130.

Figure 2:
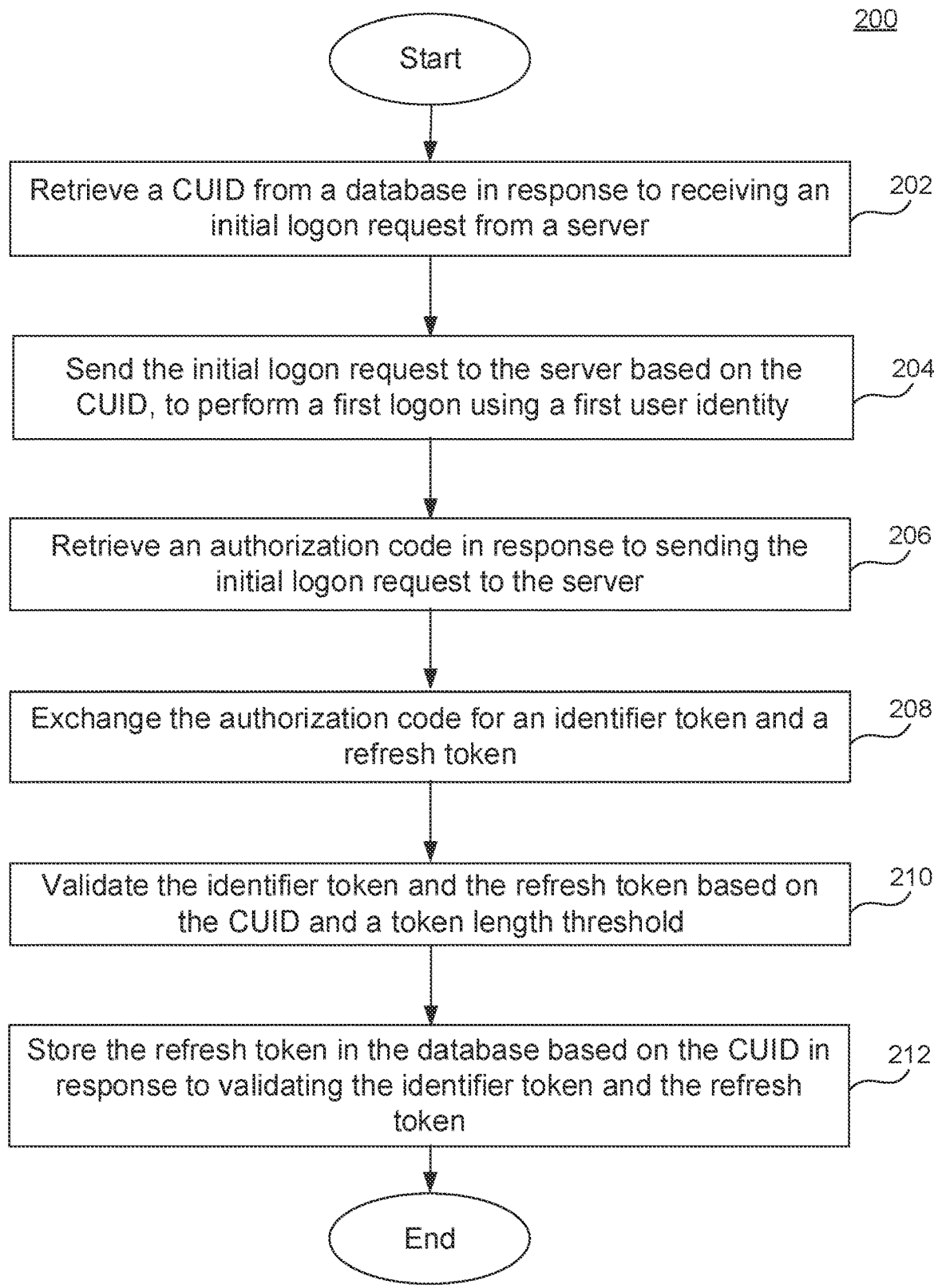
FIG. 2 is a flowchart illustrating an initial authentication and authorization process for securely accessing cloud data providers with user-impersonation, according to some embodiments.

FIG. 2 is a flowchart for an initial authentication and authorization method 200 for securely accessing cloud data providers with user-impersonation, according to an example embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, STS 102 retrieves a CUID from database 106 in response to receiving an initial logon request from server 104 for a cloud data provider 110. For example, the initial logon request from server 104 may be from user 114. The cloud data provider 110 may be a cloud data provider such as, but not limited to, a Snowflake Data Cloud®, Google Cloud Platform™, or Microsoft Azure®. The cloud data provider 110 may be configured in system 100. Configuring a cloud data provider 110 in system 100 may create a CUID particular to the cloud data provider 110. The CUID may represent configuration information.

Further in 202, STS 102 may generate a URI based on the CUID in order to contact the cloud data provider 110. The URI may be a uniform resource locator. The URI may be a uniform resource name.

In 204, STS 102 sends the initial logon request to server 104 based on the CUID in order to perform a first logon to the cloud data provider 110 using a first user identity. The first user identity may correspond to user 114. User 114 may have made the initial logon request. User 114 may be an actual user who directly interacts with the cloud data provider 110. This logon may authenticate the first user identity.

In 206, STS 102 retrieves an authorization code from the cloud data provider 110, in response to sending the initial logon request to server 104. STS 102 may receive the authorization code from server 104 after server 104 has performed a first logon to the cloud data provider 110. An authorization code may be a code that STS 102 later exchanges for a token (e.g., an identifier token, a refresh token, an access token). The authorization code may be obtained from an authorization server of cloud data provider 110.

In 208, STS 102 exchanges the authorization code for an identifier token and a refresh token issued by the cloud data provider 110. STS 102 may exchange the authorization code at a token exchange server of the cloud data provider 110. STS 102 may perform the exchange according to token exchange standards outlined by OAuth 2.0 or OpenID® Connect. STS 102's exchange of the authorization code for the identifier token and the refresh token issued by the cloud data provider 110 may authorize the first user identity to access the cloud data provider 110.

An identifier token may be used to identify a user. An identifier token may be a JSON® Web Token known as an ID token. A refresh token may be used to produce a new access token. A refresh token may have a specific lifetime. For example, a refresh token may have a lifetime longer than 24 hours and equal to or shorter than an infinite time.

STS 102 may also exchange the authorization code for an access token issued by the cloud data provider 110. The access token may be utilized in system 100 during method 200.

An access token may contain authorization information about actions allowed to be performed at the cloud data provider 110. An access token may be a JSON® Web Token. An access token may have a specific lifetime. For example, an access token may have lifetime of less than 24 hours.

In 210, STS 102 validates the identifier token and the refresh token based on the CUID. STS 102 may further validate the refresh token based on a token length threshold. The STS 102 validation may ensure that the identifier token meets security protocols and that the refresh token meets size protocols.

STS 102 may validate the identifier token by comparing an issuer URI or a token expiry value of the identifier token to the CUID of the cloud data provider 110 in order to confirm that the information matches. STS 102 may validate the identifier token after a hashing algorithm has been applied to the identifier token in order to generate a hash value. For example, STS 102 may compare the hash value of the identifier token to the CUID in order to confirm that the information matches.

STS 102 may validate the refresh token by determining that the refresh token is less than or equal to a token length threshold. A token length threshold may be equivalent to the maximum string length that database 106 can store while still functioning properly according to system 100. The token length threshold may be 4086 or less. STS 102 may also validate tokens by using an email identifier of cloud data provider 110. For example, STS 102 may match an email identifier contained within the tokens issued by cloud data provider 110 with the first user identity of user 114. The email identifier may be contained within the identifier token.

In 212, STS 102 stores the refresh token in database 106 based on the CUID in response to validating the identifier token and the refresh token.

System 100 may use similar interactions, and method 200 may use similar steps, to complete initial authentication and authorization for at least one other cloud data provider 110.

Figure 3:
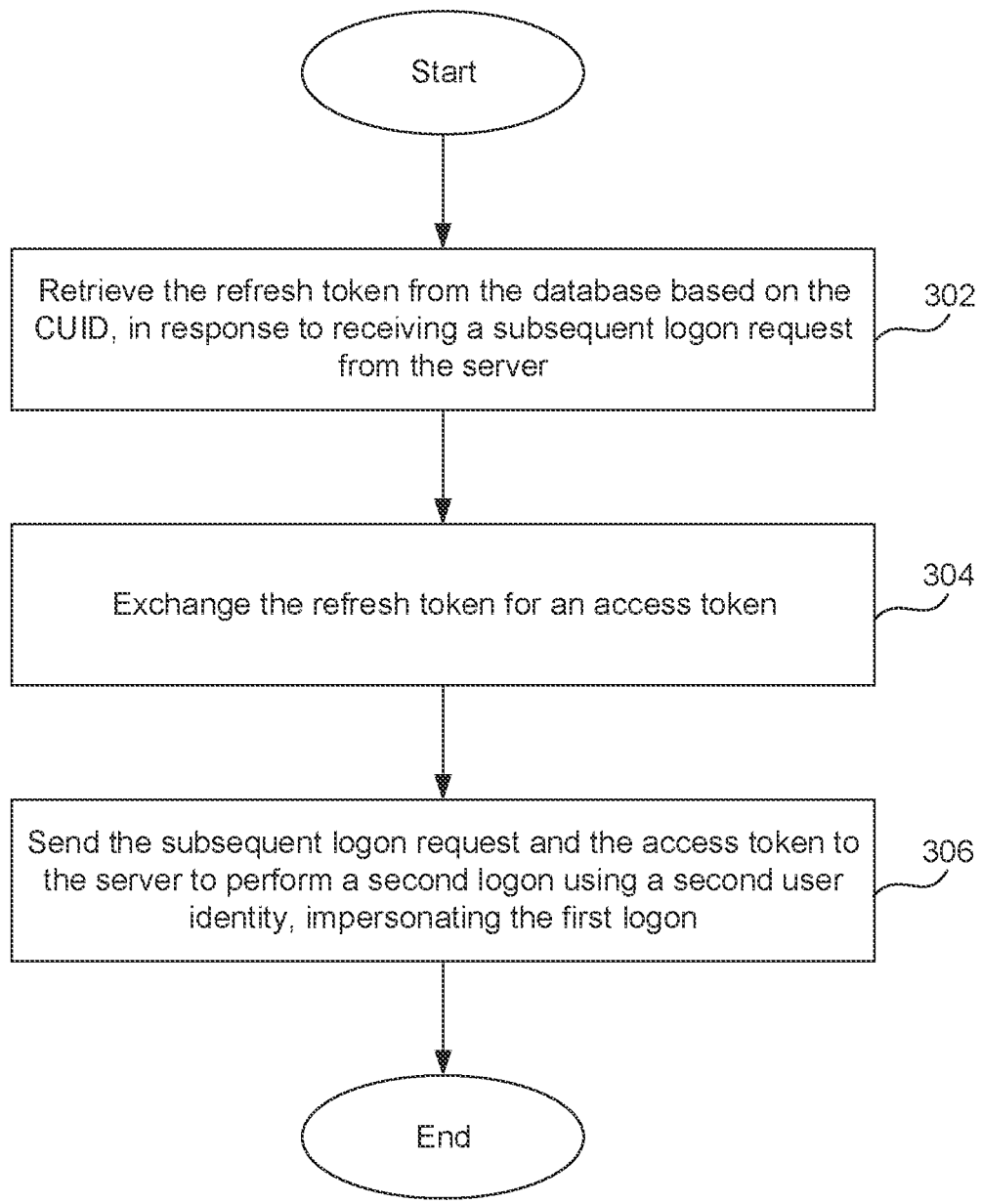
FIG. 3 is a flowchart illustrating a user-impersonation process for securely accessing cloud data providers with user-impersonation, according to some embodiments.

FIG. 3 is a flowchart for a user-impersonation method 300 for securely accessing cloud data providers with user-impersonation, according to an example embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1 and 2.

Method 300 may be used when a cloud data provider 110 has been configured, and where method 200 has been applied to provide initial authentication and authorization. However, method 300 is not limited to that example embodiment.

In 302, STS 102 retrieves the refresh token from database 106 based on the CUID in response to receiving a user-impersonation logon request from server 104 for the cloud data provider 110. For example, the user-impersonation logon request from server 104 may be from user-impersonator 116.

STS 102 may retrieve a list of all configured cloud data providers 110 from database 106 and filter the list for the CUID of the cloud data provider 110. Based on this CUID, STS 102 may retrieve the refresh token for cloud data provider 110 from database 106.

In 304, STS 102 exchanges the refresh token for an access token issued by the cloud data provider 110. STS 102 may exchange the refresh token at a token exchange server of the cloud data provider 110. The STS 102 exchange may follow token exchange standards outlined by OAuth 2.0 or OpenID® Connect. The access token may contain authorization information about actions allowed to be performed at the cloud data provider 110. The access token may be a JSON® Web Token. The access token may have a specific lifetime. For example, the access token may have lifetime of less than 24 hours.

In 306, STS 102 sends the user-impersonation logon request and the access token to server 104 in order to perform a second logon to the cloud data provider 110 using a second user identity, wherein the second logon may impersonate the first logon in 204 (e.g., of user 114).

The second user identity may correspond to user-impersonator 116. User-impersonator 116 may have made the user-impersonation logon request. User-impersonator 116 may be another actual user different from user 114. User-impersonator 116 may be a scheduling software designed to automate tasks as a user-impersonation of user 114. The second logon may provide user-impersonator 116 access to the cloud data provider 110.

Figure 4:
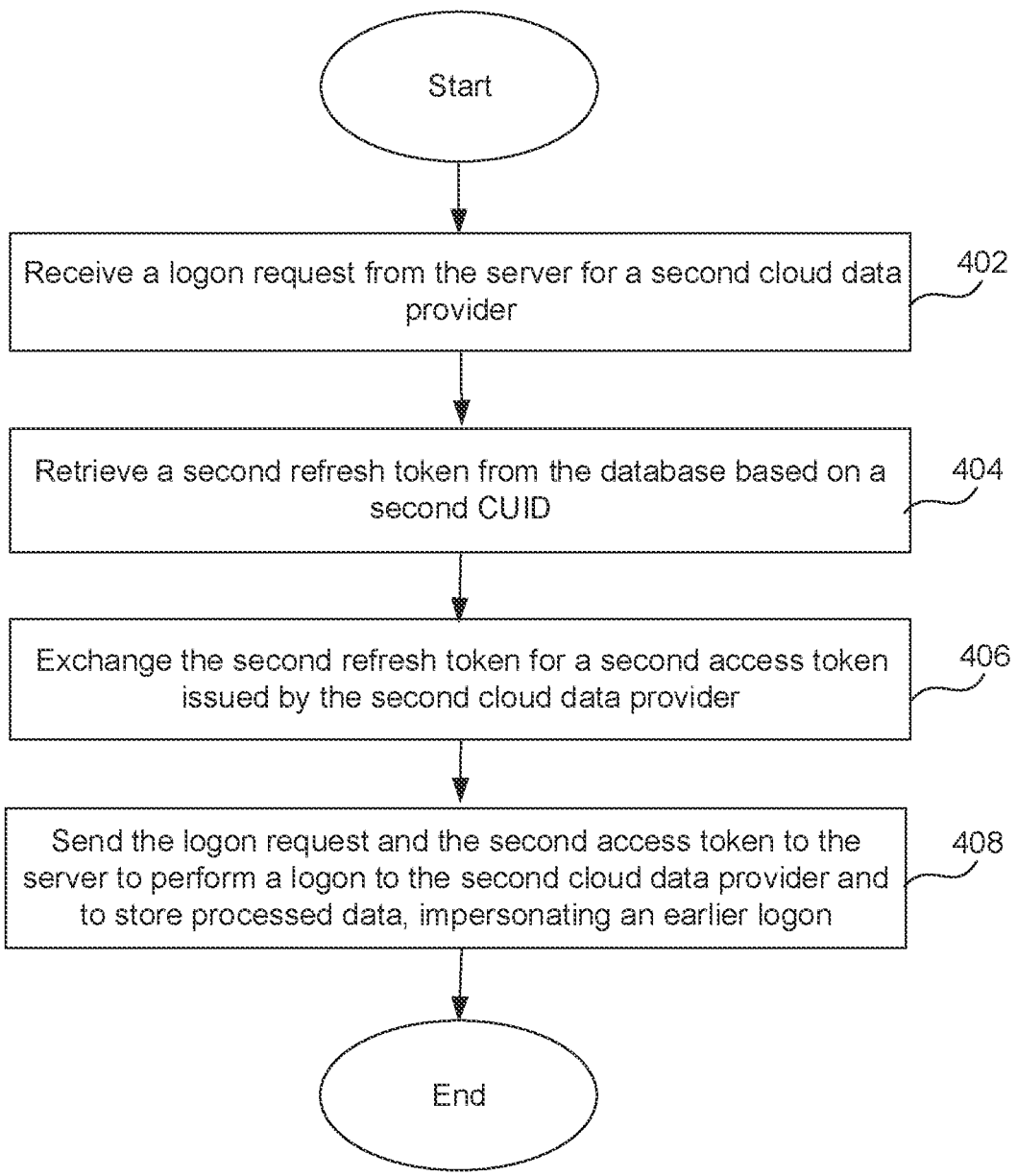
FIG. 4 is a flowchart illustrating a user-impersonation process for securely accessing an additional cloud data provider with user-impersonation, according to some embodiments.

FIG. 4 is a flowchart for a user-impersonation method 400 for securely accessing an additional cloud data provider with user-impersonation, according to an example embodiment. Method 400 can be performed by processing logic that can comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1, 2, and 3.

Method 400 may be used when multiple cloud data providers 110 have been configured, and where method 200 has been applied to provide initial authentication and authorization for cloud data providers 110-1 and 110-2. Method 400 is an example embodiment where user-impersonator 116 receives data from cloud data provider 110-1 according to user-impersonation method 300, processes the data, and stores the data in cloud data provider 110-2 with user-impersonation. However, method 400 is not limited to that example embodiment.

In 402, STS 102 receives a logon request for cloud data provider 110-2 from server 104. For example, the logon request from server 104 may be from user-impersonator 116. Cloud data provider 110-2 may be a cloud data provider such as, but not limited to, a Snowflake Data Cloud®, Google Cloud Platform™, or Microsoft Azure®.

In 404, STS 102 retrieves a second refresh token from database 106 based on a second CUID. The second refresh token may be used to produce a second access token. The second refresh token may have a specific lifetime. For example, the second refresh token may have a lifetime longer than 24 hours and equal to or shorter than an infinite time. Cloud data provider 110-2 may be configured in system 100. Configuring cloud data provider 110-2 in system 100 may create a second CUID. The second CUID may represent configuration information.

STS 102 may retrieve a list of all configured cloud data providers 110 from database 106 and filter the list for the second CUID. Based on this CUID, STS 102 may retrieve the second refresh token from database 106.

In 406, STS 102 exchanges the second refresh token for a second access token issued by cloud data provider 110-2. STS 102 may exchange the second refresh token at a token exchange server of the cloud data provider 110-2. The STS 102 exchange may follow token exchange standards outlined by OAuth 2.0 or OpenID® Connect. The second access token may contain authorization information about actions allowed to be performed at the cloud data provider 110-2. The second access token may be a JSON® Web Token. The second access token may have a specific lifetime. For example, the second access token may have lifetime of less than 24 hours.

In 408, STS 102 sends the logon request and the second access token to server 104 in order to perform a logon to the cloud data provider 110-2 using the second user identity. The logon may impersonate an earlier logon to the cloud data provider 110-2. The second user identity may correspond to user-impersonator 116. User-impersonator 116 may have made the logon request. User-impersonator 116 may be another actual user different from user 114. User-impersonator 116 may be a scheduling software designed to automate tasks as a user-impersonation of user 114. User 114 may have performed the earlier logon. The second logon may provide user-impersonator 116 access to the cloud data provider 110-2.

Server 104 may have received data from cloud data provider 110-1 after STS 102 performed 306 in method 300. Server 104 may have then sent the data to report server 112 for processing. Report server 112 may have then sent the processed data to server 104 for storage in cloud data provider 110-2.

Performing 402-408 in method 400 may have provided server 104 access to the cloud data provider 110-2. Once server 104 had access to the cloud data provider 110-2, server 104 may have then stored the processed data in cloud data provider 110-2.

Figure 5:
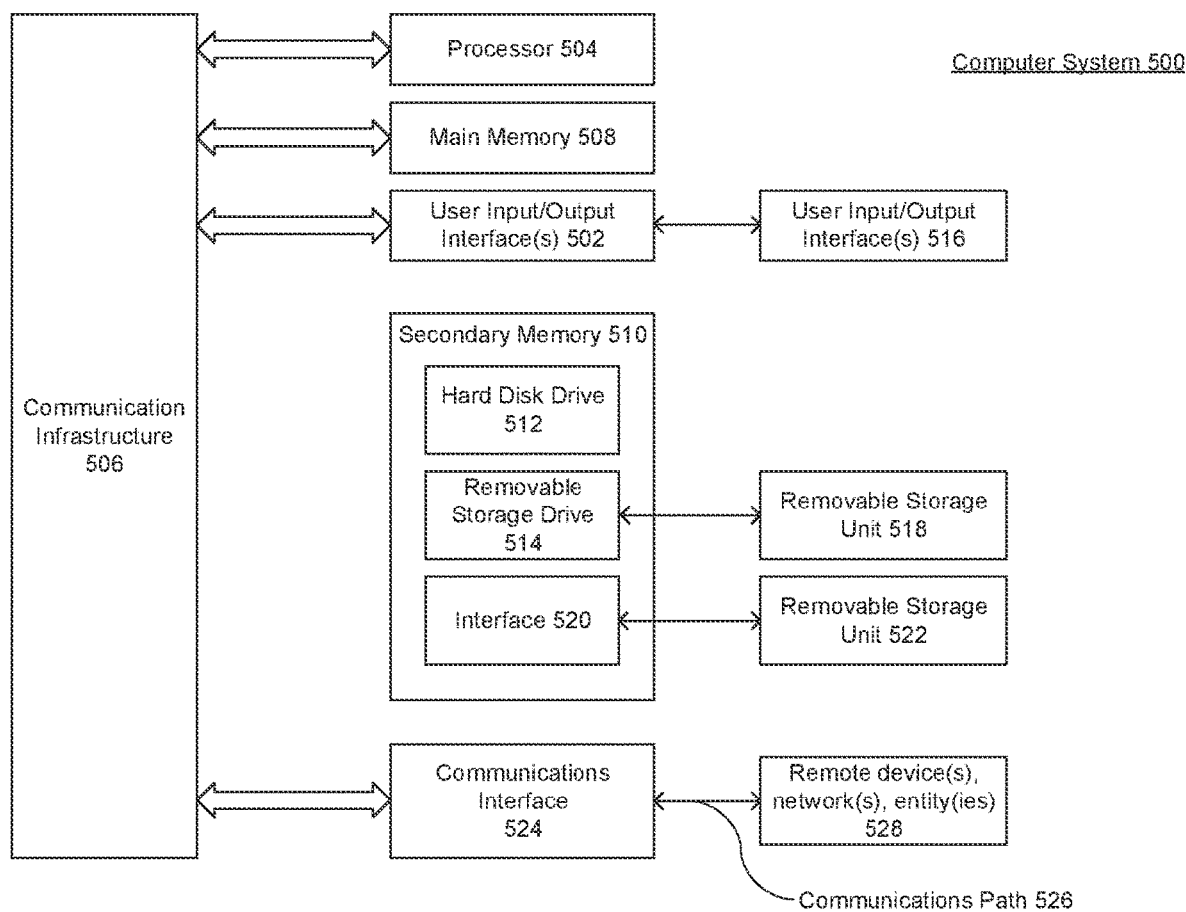
FIG. 5 is an example computer system useful for implementing various embodiments.

Various embodiments can be implemented, for example, using one or more computer systems, such as computer system 500 shown in FIG. 5. Computer system 500 can be used, for example, to implement methods 200, 300, and 400 of FIGS. 2, 3, and 4. For example, computer system 500 can validate and store refresh tokens in order to eliminate the need for reoccurring direct authentication and authorization processes at every logon attempt. Computer system 500 can further access cloud data providers with user-impersonation, according to some embodiments. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 516, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518.

Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for accessing a cloud data provider with user-impersonation, comprising:
    retrieving a cluster unique identifier (CUID) from a database in response to receiving an initial logon request from a server, wherein the CUID represents a configuration of the cloud data provider;
    sending the initial logon request to the server based on the CUID, thereby performing a first logon to the cloud data provider using a first user identity associated with a first user;
    retrieving an authorization code from the cloud data provider in response to sending the initial logon request to the server;
    exchanging the authorization code for an identifier token and a refresh token issued by the cloud data provider;
    validating the identifier token and the refresh token based on the CUID and a token length threshold;
    storing the refresh token in the database based on the CUID in response to validating the identifier token and the refresh token;
    receiving a user-impersonation logon request from a second user identity associated with a second user;
    in response to receiving the user-impersonation logon request from the second user, retrieving the refresh token from the database based on the CUID;
    exchanging, based on the CUID, the refresh token for an access token issued by the cloud data provider; and
    sending the user-impersonation logon request for the second user and the access token received in exchange for the refresh token, to the server, thereby performing a second logon to the cloud data provider using the second user identity, wherein the second logon impersonates the first logon,
    wherein at least one of the retrieving a CUID, sending the initial logon request, retrieving an authorization code, exchanging the authorization code, validating, storing, retrieving the refresh token, exchanging the refresh token, and sending the user-impersonation logon request are performed by one or more computers.

2. The computer implemented method of claim 1, further comprising:
    generating a uniform resource identifier (URI) based on the CUID.

3. The computer implemented method of claim 1, the validating further comprising:
    comparing an issuer uniform resource identifier (URI) or a token expiry value of the identifier token to the CUID.

4. The computer implemented method of claim 1, the validating further comprising:
    applying a hashing algorithm to the identifier token, thereby generating a hash value; and
    comparing the hash value to the CUID.

5. The computer implemented method of claim 1, the validating further comprising:
    determining that the refresh token is less than or equal to the token length threshold.

6. The computer implemented method of claim 1, the validating further comprising:
    determining that an email identifier of the cloud data provider corresponds to the first user identity.

7. The computer implemented method of claim 1, further comprising:
    receiving, from the server, a logon request for a second cloud data provider;
    retrieving a second refresh token from the database based on a second CUID;
    exchanging the second refresh token for a second access token issued by the second cloud data provider; and
    sending the logon request and the second access token to the server, thereby performing a logon to the second cloud data provider using the second user identity and storing processed data, wherein the logon impersonates an earlier logon to the second cloud data provider and the processed data was received by the server in the earlier logon and was processed by a report server.

8. The computer implemented method of claim 1, wherein the refresh token has a lifetime longer than a lifetime of the access token.

9. A system for accessing a cloud data provider with user-impersonation, comprising:
    a memory; and
    at least one processor coupled to the memory and configured to:
        retrieve a cluster unique identifier (CUID) from a database in response to receiving an initial logon request from a server, wherein the CUID represents a configuration of the cloud data provider;
        send the initial logon request to the server based on the CUID, thereby performing a first logon to the cloud data provider with use of a first user identity associated with a first user;
        retrieve an authorization code from the cloud data provider in response to the initial logon request being sent to the server;
        exchange the authorization code for an identifier token and a refresh token issued by the cloud data provider;
        validate the identifier token and the refresh token based on the CUID and a token length threshold;
        store the refresh token in the database based on the CUID in response to validation of the identifier token and the refresh token;
        receive a user-impersonation logon request from a second user identity associated with a second user;
        in response to receipt of the user-impersonation logon request from the second user, retrieving the refresh token from the database based on the CUID;

exchange, based on the CUID, the refresh token for an access token issued by the cloud data provider; and send the user-impersonation logon request for the second user and the access token received in exchange for the refresh token, to the server, thereby performing a second logon to the cloud data provider using the second user identity, wherein the second logon impersonates the first logon.

10. The system of claim 9, the at least one processor further configured to:

generate a uniform resource identifier (URI) based on the CUID.

11. The system of claim 9, wherein to validate, the at least one processor is configured to:

compare an issuer uniform resource identifier (URI) or a token expiry value of the identifier token to the CUID.

12. The system of claim 9, wherein to validate, the at least one processor is configured to:

apply a hashing algorithm to the identifier token, to generate a hash value; and compare the hash value to the CUID.

13. The system of claim 9, wherein to validate, the at least one processor is configured to:

determine that the refresh token is less than or equal to the token length threshold.

14. The system of claim 9, wherein to validate, the at least one processor is configured to:

determine that an email identifier of the cloud data provider corresponds to the first user identity.

15. The system of claim 9, the at least one processor further configured to:

receive, from the server, a logon request for a second cloud data provider;

retrieve a second refresh token from the database based on a second CUID;

exchange the second refresh token for a second access token issued by the second cloud data provider; and send the logon request and the second access token to the server, to perform a logon to the second cloud data provider with use of the second user identity and to store processed data, wherein the logon impersonates an earlier logon to the second cloud data provider and the processed data was received by the server in the earlier logon and was processed by a report server.

16. A non-transitory computer-readable medium having instructions stored thereon that, when executed by at least one computing device, cause the at least one computing device to perform operations comprising:

retrieving a cluster unique identifier (CUID) from a database in response to receiving an initial logon request from a server, wherein the CUID represents a configuration of a cloud data provider;

sending the initial logon request to the server based on the CUID, thereby performing a first logon to the cloud data provider using a first user identity associated with a first user;

retrieving an authorization code from the cloud data provider in response to sending the initial logon request to the server;

exchanging the authorization code for an identifier token and a refresh token issued by the cloud data provider;

validating the identifier token and the refresh token based on the CUID and a token length threshold;

storing the refresh token in the database based on the CUID in response to validating the identifier token and the refresh token;

receiving a user-impersonation logon request from a second user identity associated with a second user;

in response to receiving the user-impersonation logon request from the second user, retrieving the refresh token from the database based on the CUID;

exchanging, based on the CUID, the refresh token for an access token issued by the cloud data provider; and sending the user-impersonation logon request for the second user and the access token received in exchange for the refresh token, to the server, thereby performing a second logon to the cloud data provider using the second user identity, wherein the second logon impersonates the first logon.

17. The non-transitory computer-readable medium of claim 16, the operations further comprising:

generating a uniform resource identifier (URI) based on the CUID.

18. The non-transitory computer-readable medium of claim 16, the validating comprising:

applying a hashing algorithm to the identifier token, thereby generating a hash value; and comparing the hash value to the CUID.

19. The non-transitory computer-readable medium of claim 16, the validating comprising:

determining that an email identifier of the cloud data provider corresponds to the first user identity.

20. The non-transitory computer-readable medium of claim 16, the operations further comprising:

receiving, from the server, a logon request for a second cloud data provider;

retrieving a second refresh token from the database based on a second CUID;

exchanging the second refresh token for a second access token issued by the second cloud data provider; and sending the logon request and the second access token to the server, thereby performing a logon to the second cloud data provider using the second user identity and storing processed data, wherein the logon impersonates an earlier logon to the second cloud data provider and the processed data was received by the server in the earlier logon and was processed by a report server.

* * * * *